Figure 1:
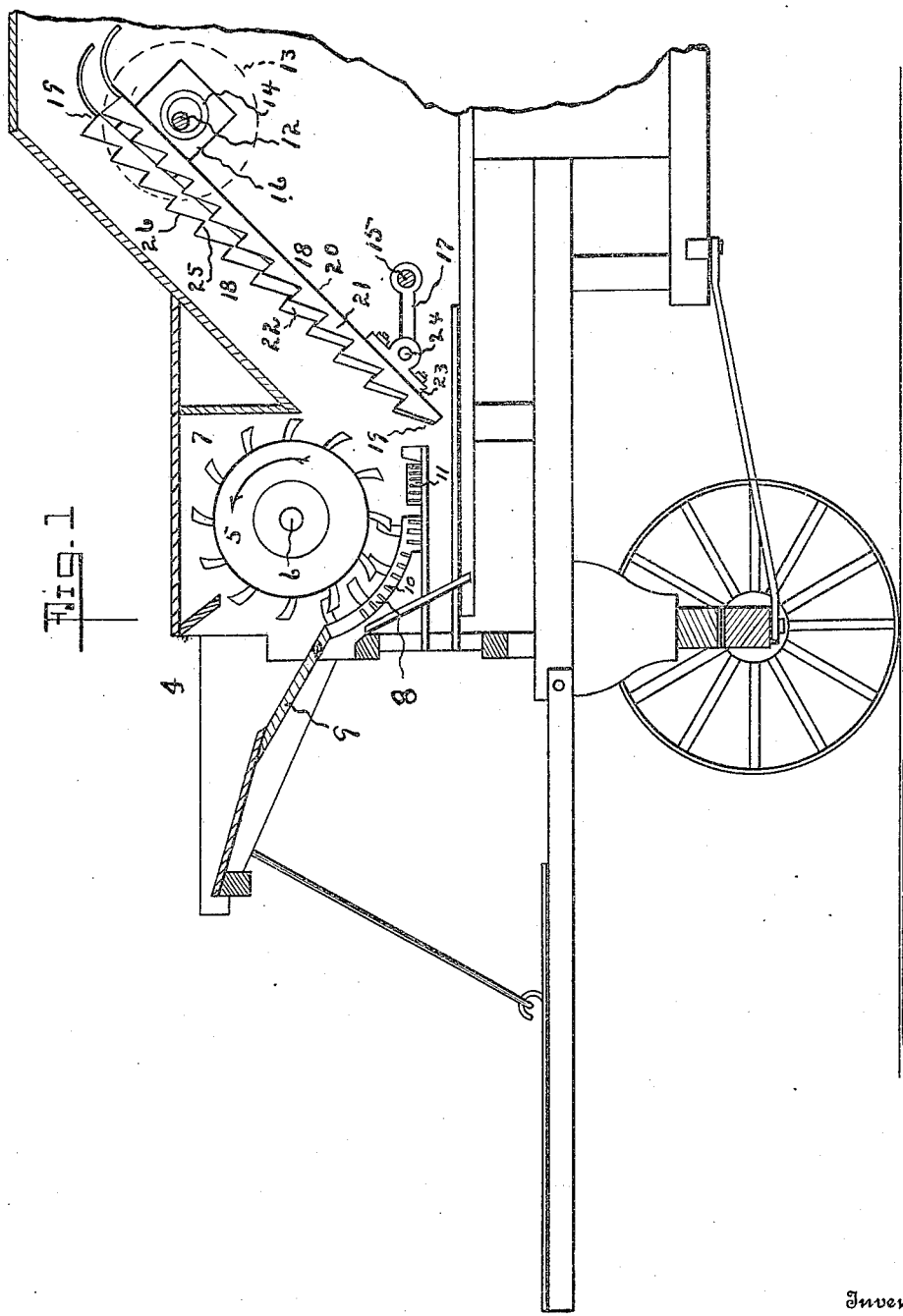

G. E. ARNOLD.
GRAIN SEPARATOR.
APPLICATION FILED MAR. 3, 1909.

934,989.

Patented Sept. 28, 1909.
3 SHEETS—SHEET 1.

Witnesses
Arthur Sturges.
George W. Covell

Inventor
George E. Arnold
By Hiram A. Sturges,
Attorney

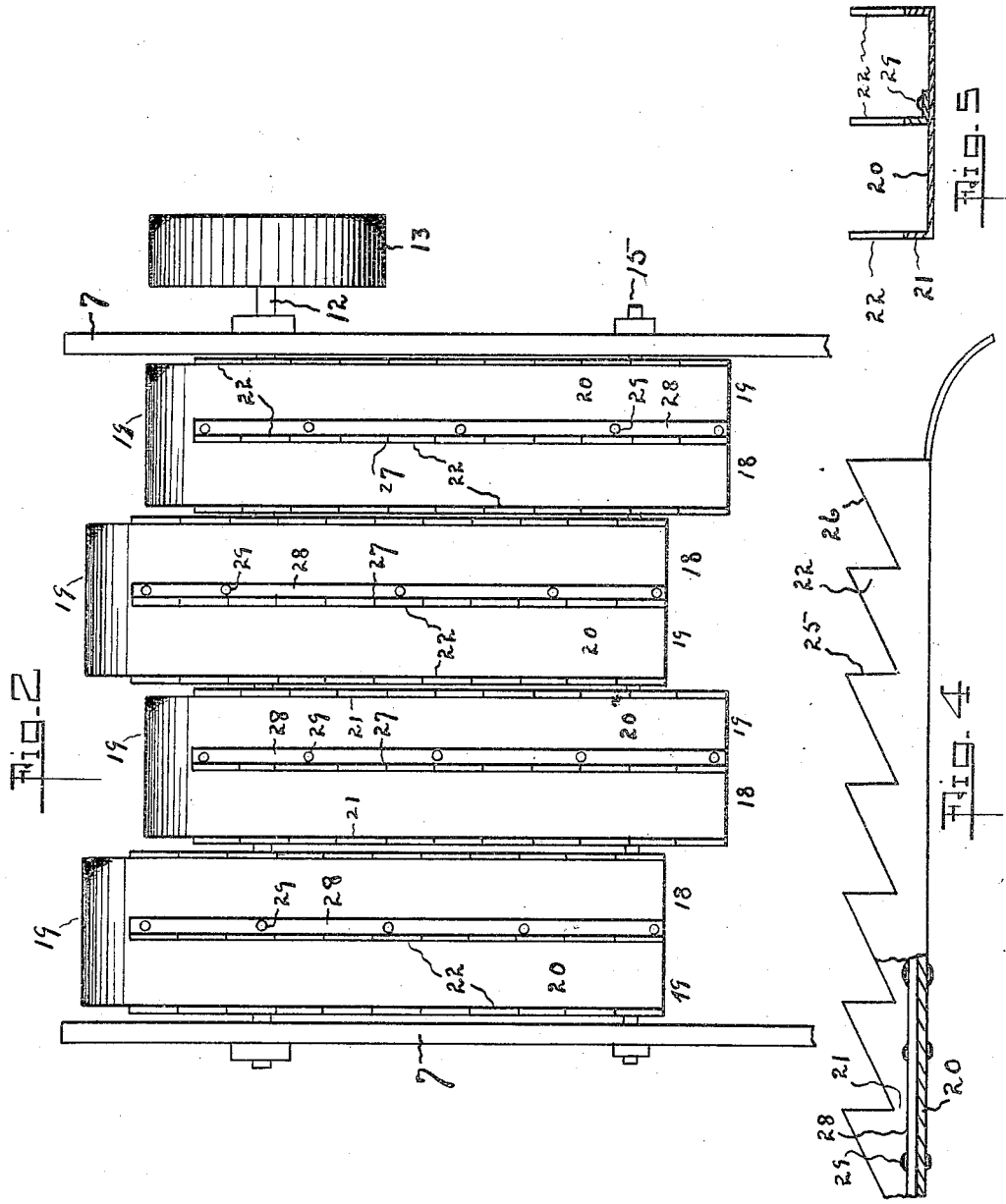

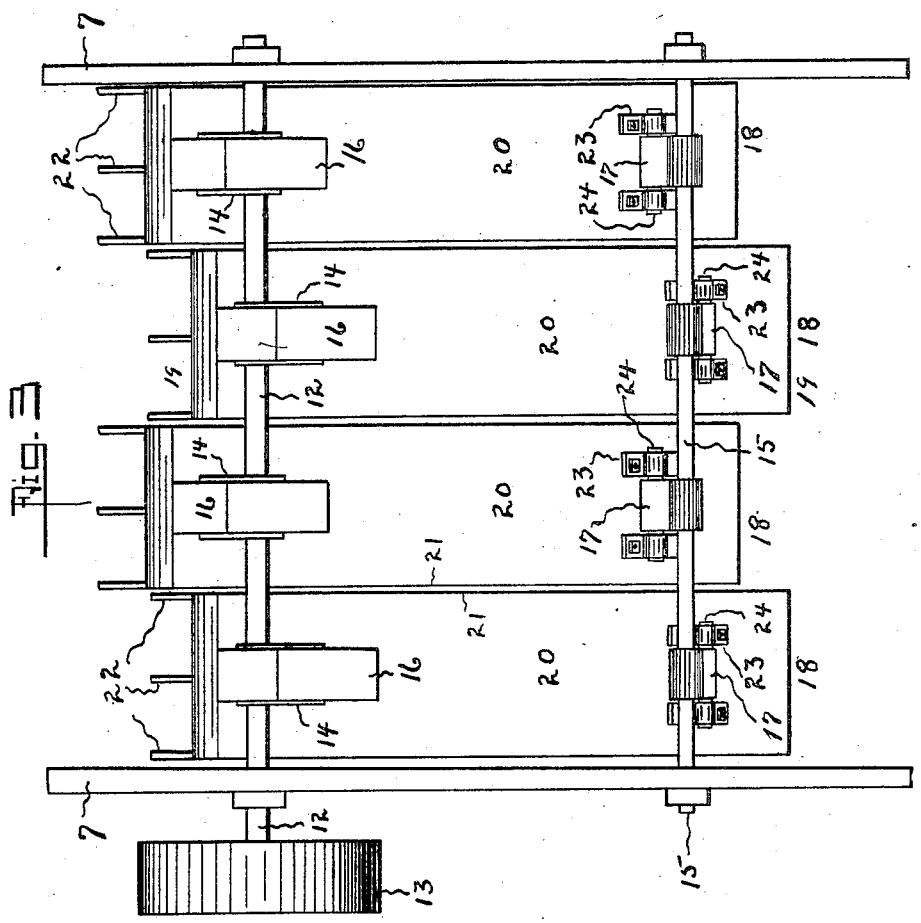

UNITED STATES PATENT OFFICE.

GEORGE E. ARNOLD, OF PICKRELL, NEBRASKA.

GRAIN-SEPARATOR.

934,989.

Specification of Letters Patent.  Patented Sept. 28, 1909.

Application filed March 3, 1909. Serial No. 481,056.

*To all whom it may concern:*

Be it known that I, GEORGE E. ARNOLD, a citizen of the United States, residing at Pickrell, in the county of Gage and State of Nebraska, have invented certain new and useful Improvements in Grain-Separators, of which the following is a specification.

This invention relates to improvements in separating attachments for threshing machines, and has for its object, broadly, to provide means for effectively separating grain from straw or other residue, and to prevent the loss of grain, during the process of threshing, said means comprising an attachment which may be mounted in the machine adjacent and rearwardly of the cylinder.

The invention has reference to the employment of a series of longitudinally inclined straw racks mounted side by side upon eccentrics, each straw rack having teeth for engaging the straw and formed with channels for the return of the grain to the grain-grate, the conveyors, by reason of their vibratory or oscillating movements operating to thoroughly dislodge the grain from the straw or other refuse, and causing the grain to slide or pass downwardly and forwardly to the grate, the straw and other refuse being carried upwardly and rearwardly to another part of the machine.

Another object is to provide a separator, so constructed that it will operate to advantage within a limited space, so that threshing machines may hereafter be built with a less length than formerly; also to provide a separator which may be conveniently placed in machines already built or manufactured.

Another object is the provision of an attachment of the class described, which will be reliable in operation, but will consist of few and simple parts so that it may be comparatively inexpensive in construction.

With these and other objects in view, the invention presents a novel combination and arrangement of parts, as described herein, pointed out by the appended claims, and as illustrated in the accompanying drawing, wherein,—

Figure 1 is a vertical side view of the front part of a threshing machine, partly in section, with a separator mounted thereon, embodying my invention. Fig. 2 is a front or plan view of the separator. Fig. 3 is a rear view of the same. Figs. 4 and 5 are details relating to the straw racks, Fig. 4 being a side view, partly broken away, and Fig. 5 being a transverse sectional view of a straw rack.

Referring now to the drawing for a more particular description, numeral 4 indicates a threshing machine ordinarily used for threshing wheat, oats and the like, comprising the cylinder 5 having a shaft 6 mounted in sides 7 of the machine. At 8 is shown the stationary toothed rack or concave and at 9 is indicated the feeding-board. The cylinder is adapted to have a movement in the direction indicated by the arrow in Fig. 1, and it will be understood that grain to be threshed is fed between the adjacent teeth of the cylinder and concave 8 from the front of the machine, and while passing therebetween, the grain is stripped from the stalks or stems. The grain, after being detached from the stems, passes downward, for the most part, either through apertures 10 of the concave or through the grate 11, these features being common to nearly all machines. After passing downward through the apertures mentioned, the grain is moved and cleaned by other parts of the machine.

On account of the high degree of revoluble speed of the cylinder a large percentage of grain is thrown rearward with the straw, and this is true with respect to the operation of all threshing machines; various devices have been employed, such as revolving beaters, pickers or shaking-forks and have been mounted in the machine to separate or dislodge from the stalks the grain which has thus passed or been thrown to the rear of the grating. To operate the machinery for these several devices requires a considerable amount of additional power and requires an inclosed machine of considerable length.

In order to effectually prevent the grain from passing to the rear of the machine, and to cause a separation of the grain from the straw at or near the front of said machine, I provide means now to be described.

Rearwardly of cylinder 5 and near the top of the machine I mount the horizontal shaft 12 to be driven by pulley 13 in either direction. The shaft may have its ends mounted upon sides 7 of the machine, and is provided with eccentrics 14. I provide the horizontal idler shaft 15 to be mounted at a lower altitude than shaft 12, between sides 7 of the machine and intermediate shafts 12 and 6. Upon each eccentric is seated a housing block 16 of any suitable dimensions or material, and upon shaft 15 are mounted rock-arms 17. I provide the straw racks indicated at 18. They may be constructed of any suitable material, but sheet metal is preferred, and, as compared with each other they are uniform in size and structure. The straw racks are formed as longitudinal troughs or chutes with open front and rear ends 19 and provided with flat bottoms 20, their sides 21 being formed, preferably, at a right angle to their bottoms, and the upper edge of their sides are incised to form teeth 22. The straw racks are disposed inclinedly, their upper ends being secured upon blocks 16 and their lower ends are secured upon blocks 23, said blocks 23 having a pivotal connection 24 with the terminals of rock-arms 17. As thus described, any grain which is thrown rearwardly from the cylinder or carried with the straw will encounter the straw racks. Said straw racks are mounted closely adjacent, side by side upon shaft 12, and on account of the movement of the eccentrics the straw racks each have a longitudinally-oscillating, undulatory movement and while one straw rack is moving upwardly and rearwardly, the adjacent straw rack is moving downwardly and forwardly, the result being that they coöperate to move the straw upwardly and rearwardly, the grain being dislodged and sliding downward to pass through or below grate 11.

It will be noted that the teeth are each formed with an edge 25 substantially at right angles with the bottom 20 of the trough, edge 26 of the teeth having an upward and rearward inclination, whereby they operate as straw carriers or straw racks as mentioned.

While I have, in the above description, mentioned eccentrics mounted upon shaft 12 for causing the back-and-front motions of the straw racks, crank-shafts may be substituted for the eccentrics and employed if desired, the straw racks being pivotally mounted thereon.

While I have shown four straw racks mounted upon shaft 12, a greater or lesser number may be used, if desired. The device operates in every instance to reliably separate the grain from other refuse. The straw racks operate as a barrier interposed to prevent the rearward movement through the machine of any grain, and to cause the grain to be returned to the grain-grate adjacent the cylinder.

The troughs may have any desired degree of inclination; they occupy a very limited space longitudinally of the machine, and by use of the herein described separator the machine may have a much less length than formerly constructed.

Partitions 27 may be seated midway between sides 21 and provided with angular bases 28. By use of rivets 29, the bases may be secured to bottoms 20 of the straw racks. Partitions 27 are parallel with sides 21 and are formed with teeth 22 upon their upper edges and are similar in all respects to those already described; the upper terminals of bottoms 20 may have a curvature as shown, if desired.

Having fully explained construction and operation of my invention, what I claim as new and desire to secure by United States Letters Patent is,—

In a device of the character described, the combination with a housing, of a transverse toothed cylinder mounted therein, a toothed concave with which the teeth of said cylinder coact, a vertical wall disposed directly in the rear of said cylinder, an inclined wall leading rearwardly from the lower edge of said vertical wall, and a plurality of straw racks located at an angle of not less than forty five degrees and substantially parallel with and beneath said inclined wall, the straw from said cylinder being carried upwardly between said straw racks and said inclined wall, said straw racks being trough-like in form and having their upper edges serrated, and each of said straw racks having a downwardly curved terminal portion at its upper end.

In testimony whereof I have affixed my signature in presence of two witnesses.

GEORGE E. ARNOLD.

Witnesses:
M. B. PIERCE,
WM. HENDERSON.